United States Patent
Tujkovic

(10) Patent No.: US 10,264,508 B2
(45) Date of Patent: *Apr. 16, 2019

(54) INTERFERENCE MANAGEMENT IN A MULTI-HOP WIRELESS NETWORK

(71) Applicant: Facebook, Inc., Menlo Park, CA (US)

(72) Inventor: Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,893

(22) Filed: Dec. 28, 2016

(65) Prior Publication Data
US 2017/0195939 A1 Jul. 6, 2017

Related U.S. Application Data

(60) Provisional application No. 62/274,154, filed on Dec. 31, 2015.

(51) Int. Cl.
| | | |
|---|---|---|
| *H04B 7/06* | (2006.01) | |
| *H04B 7/08* | (2006.01) | |
| *H04W 24/02* | (2009.01) | |
| *H04W 40/16* | (2009.01) | |
| *H04W 28/02* | (2009.01) | |
| *H04W 72/12* | (2009.01) | |

(52) U.S. Cl.
CPC ......... *H04W 40/16* (2013.01); *H04B 7/0617* (2013.01); *H04B 7/086* (2013.01); *H04W 24/02* (2013.01); *H04W 28/0236* (2013.01); *H04W 72/1231* (2013.01)

(58) Field of Classification Search
CPC ...... H04B 7/0617; H04B 7/086; H04B 7/043; H04B 7/0408; H04W 24/02
See application file for complete search history.

(56) References Cited

U.S. PATENT DOCUMENTS

| | | | |
|---|---|---|---|
| 2011/0013711 A1* | 1/2011 | Wang .................. | H04B 7/0439 375/267 |
| 2017/0195909 A1* | 7/2017 | Tujkovic .......... | H04W 28/0236 |

* cited by examiner

*Primary Examiner* — Hoon J Chung
(74) *Attorney, Agent, or Firm* — Baker Botts L.L.P.

(57) ABSTRACT

In one embodiment, a method includes, by a controller of a multi-hop wireless network, accessing an interference map indicating interference among network nodes of the multi-hop wireless network. The controller may generate a factor-graph representation of the multi-hop wireless network that includes a first set of vertices which represent variable nodes and correspond to transmitting (TX) sectors of the network nodes and a second set of vertices which represent function nodes and correspond to receiving (RX) sectors of the network nodes. The controller may determine one or more adjustments to one or more beamforming weights of sectors of the network nodes, wherein for each of the TX or RX sectors, a beamforming weight is determined by a marginal a posteriori probability for each variable of the beamforming weight; and the adjustments reduce interference among the network nodes to increase a sum capacity of the multi-hop wireless network.

20 Claims, 7 Drawing Sheets

INTERFERENCE MANAGEMENT IN A MULTI-HOP WIRELESS NETWORK

PRIORITY

This application claims the benefit, under 35 U.S.C. § 119(e), of U.S. Provisional Patent Application No. 62/274,154, filed 31 Dec. 2015, which is incorporated herein by reference.

TECHNICAL FIELD

This disclosure generally relates to wireless communication networks.

BACKGROUND

A multi-hop wireless network may facilitate the communication of data where wired communication is unavailable, impractical, or impossible. For example, a multi-hop wireless network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A multi-hop wireless network may include multiple wirelessly interconnected network nodes. A wireless connection between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the multi-hop wireless network to the core or backbone network. A CN may communicate with DNs and CEs to connect a customer network to the multi-hop wireless network.

SUMMARY OF PARTICULAR EMBODIMENTS

Particular embodiments provide an interference-management system to reduce overall interference in a multi-hop wireless network. Currently, beamforming acquisition in a multi-hop network typically selects the best micro-routes and nano-routes to maximize individual link capacity, without regard to the interference effects those routes will have on neighboring nodes. Such a "greedy" approach is simple, but less than optimal for overall network performance. In particular embodiments, to address this problem, interference among nodes is measured and mapped after ignition of the network and the mapping is used to (1) adjust beamforming weights to reduce interference with neighboring nodes (even if the resulting directions of the beams reduce the capacities of individual links); (2) identify and exclude micro-routes that cause excessive interference; or (3) determine a time-division multiplexing (TDM) scheme for the network.

DESCRIPTION OF EXAMPLE EMBODIMENTS

Figure 1:
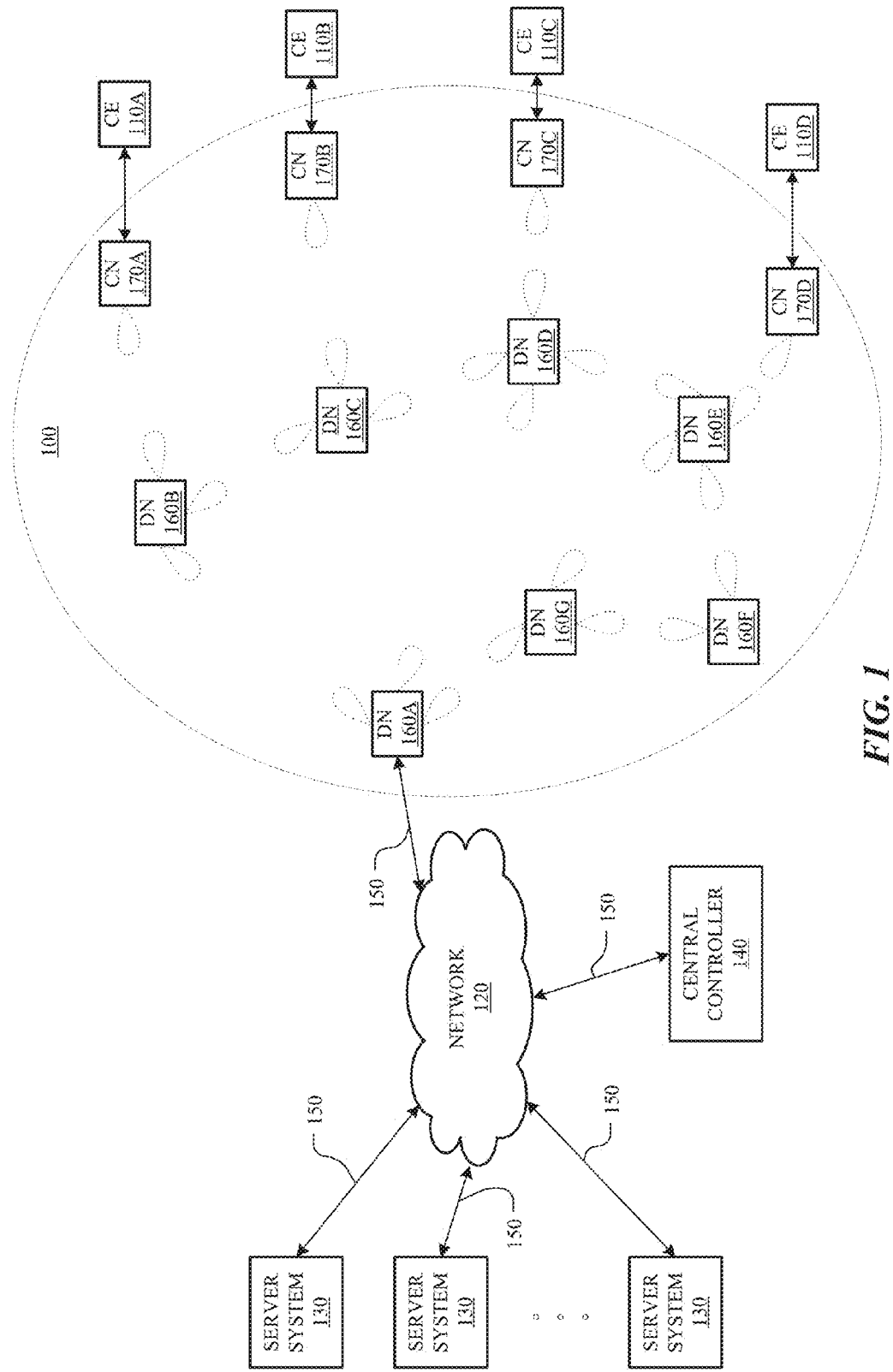
FIG. 1 illustrates an example multi-hop wireless network.

FIG. 1 illustrates an example multi-hop wireless network 100. In the example of FIG. 1, multi-hop wireless network 100 connects CE 110 at customer premises (such as residences or places of businesses) to a core or backbone network 120 (which may include one or more portions of the Internet). Network 120 connects multi-hop wireless network 100 to one or more server systems 130. Network 120 may also connect central controller 140 to multi-hop wireless network 100. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Links 150 may connect multi-hop wireless network 100, server systems 130, and central controller 140 to network 110. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where appropriate. In particular embodiments, one or more links 150 may each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of multi-hop wireless network 100, server systems 130, or central controller 140 may be connected to each other directly, bypassing network 120. As another example, two or more of multi-hop wireless network 100, server systems 130, or central controller 140 may be physically or logically co-located with each other in whole or in part.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for multi-hop wireless network 100, which may include coordinating ignition of DNs 160 and CNs 170, as described below. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to multi-hop wireless network 100 by network 120. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, multi-hop wireless network 100 includes multiple DNs 160 and CNs 170. A DN 160 wirelessly communicates with one or more CNs 170 or one or more other DNs 160 to relay data through multi-hop wireless network 100. DN 160A also communicates through a link 150 with one or more edge devices of network 120 to connect multi-hop wireless network 100 to network 120, providing a point-of-presence (PoP) for multi-hop wireless network 100 on network 120. A CN 170 communicates with one or more DNs 160 and CE 110 to connect a customer network to the multi-hop wireless network. One or more wireline or other suitable links may connect a CN 170 to CE 110. A CE 100 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, multi-hop wireless network 100 includes multiple DNs 160 and CNs 170. Wireless communication in multi-hop wireless network 100 may be point-to-point, and DNs 160 and CNs 170 may communicate wirelessly with each other in one or more frequency bands at or around 60 GHz. A DN 160 or CN 170 may have a maximum range of approximately 1.5 kilometers, but may typically communicate with other DNs 160 or CNs within approximately 200-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of multi-hop wireless network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG. 1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example multi-hop wireless network with a particular number of particular network nodes in a particular arrangement with particular numbers of particular beamforming antenna arrays aimed in particular directions, this disclosure contemplates any suitable multi-hop wireless network with any suitable number of any suitable network nodes in any suitable arrangement with any suitable numbers of any suitable beamforming antenna arrays aimed in any suitable directions.

To improve communication paths between network nodes, to reduce interference, and to increase the throughput of the network, DNs 16 and CNs 170 may include multiple antennas composing one or more antenna arrays that may be used to control the transmit and receive directions of the node by employing beamforming techniques, as described above. Beamforming may be used to point an antenna array at a target to reduce interference and improve communication quality. In beamforming, both the amplitude and phase of each antenna may be controlled. Combined amplitude and phase control may be used to adjust the transmit and receive signals on network nodes As will be appreciated by those skilled in the art of radio frequency communications, the radio frequency signals transmitted by each of the antennas or antenna arrays can be selectively timed by beamforming techniques to direct the main lobe (which can comprise the bulk of the transmitted signal power) in a desired direction. Similarly, signals received by the antennas can be delayed and summed using beamforming techniques to change the effective listening direction of the receiver. In the example of FIG. 1, network nodes can beamform their transmit and receive signals in several different directions, as well as other directions. Beamform training involves a transmitting network node and a receiving network node. The transmitting network node transmits training packets in each of a number of possible transmitting directions and the receiving network node listens to determine the transmission direction with which it can best detect the transmitted packets.

The current methods of beamforming acquisition and training are performed in a greedy manner (e.g. each transmitter and receiver may be configured to maximize its own signal strength without regard for the interference effects their signal has on neighboring network nodes). Because all the network nodes in the multi-hop wireless network operate on the same frequency band (e.g. 60 GHz), signals from some network nodes may interfere with signals from neighboring network nodes. In adjusting their beamforming weights to maximize their own signal strengths, at least some network nodes may select a beamform weight that is sub-optimal for the multi-hop wireless network as a whole, despite the selection of beamform weights maximizing the individual signal strength between two network nodes. A particular beamform weight may be sub-optimal if it interferes excessively with the signals of other network nodes. Therefore, it may be desirable to reduce the interference over the entire multi-hop network by making adjustments to the operation of at least some of the network nodes. Such adjustments may reduce the signal strength between of a particular link, but the adjustments may also improve the coverage and transmission speed of the multi-hop wireless network as a whole.

As an example and not by way of limitation, to reduce the overall interference on the network, a particular network node pair may be directed to select a communication path other than the best communication path between themselves. Therefore, the network node pair may not select the best transmit and receive beamforming directions for themselves. Instead, the network node pair may select the second- or third-best transmit and receive beamforming directions because one of those beamform pairs may have been determined to be better for the network as a whole.

Figure 2:
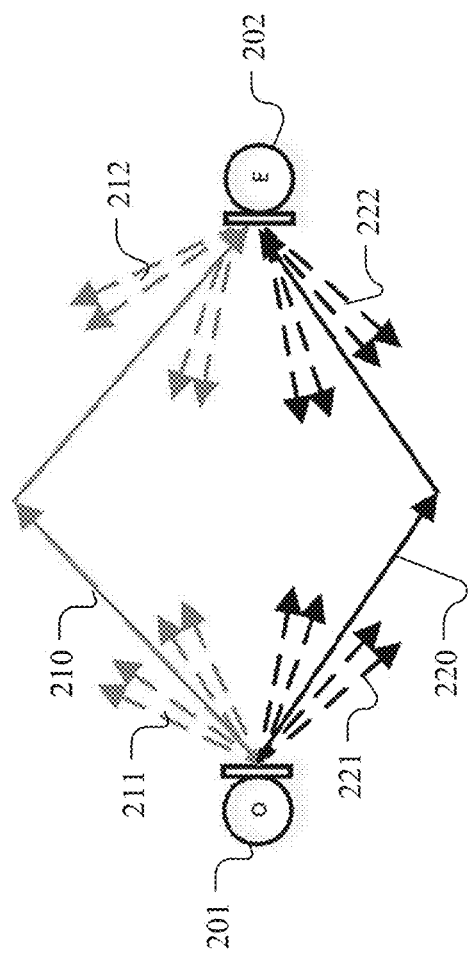
FIG. 2 illustrates example micro-routes and nano-routes between network nodes.

FIG. 2 illustrates example micro-routes and nano-routes between network nodes. Depicted are two possible micro-routes 210 and 220 between network nodes 201 and 202. Each micro-route on the side of the transmitter network node 201 has four nano-routes 211 and 221. Each micro-route on the side of the receiving network node 202 has four nano-routes 212 and 222. Nano routes 211, 221, 212, and 222 represent example alternate signal paths the micro-routes 210 and 220 may take from network node 201 to network node 202. By adjusting beamforming weights, the network nodes 201 and 202 may be able to select particular micro-routes and nano-routes for data transmission and reception. Depending on the micro-route and nano-route(s) selected, interference with other network nodes might be greater or smaller. Also depending on the micro-route and nano-route(s) selected, link capacity between network nodes 201 and 202 might be greater or smaller. It may be a goal of the interference management system to determine the proper beamforming weights and thus the selection of micro-routes and nano-routes to reduce interference on the multi-hop wireless network while simultaneously maintaining a relatively strong link capacity between individual pairs of network nodes.

Figure 3:
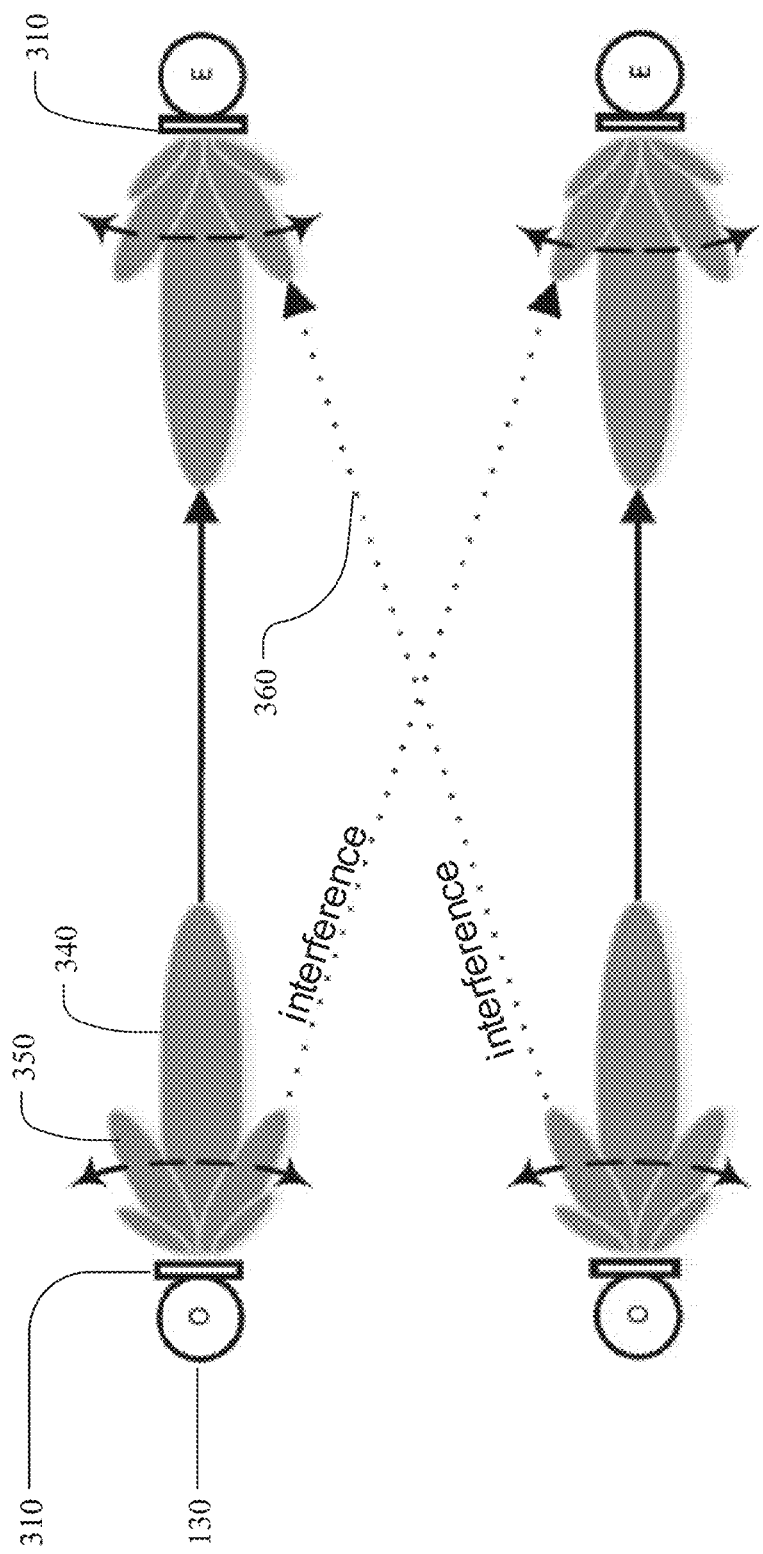
FIG. 3 illustrates example transmission (TX) and reception (RX) beamforming weights on TX and RX network nodes.

FIG. 3 illustrates example TX and RX beamforming weights on TX and RX network nodes. Each network node 130 may include one or more sectors 310. Each sector 310 may include an array of beamforming antennas. As an example and not by way of limitation, a street pole may have four separate antenna arrays on it, each antenna array facing a different direction (e.g. north, south, east, west). In this scenario, the node may be the street pole, and each of the antenna arrays may be a sector 310. To improve the communication path between the network nodes 130, and to increase network throughput, at least some of the network nodes 130 may include a transceiver and an antenna array on a sector. The antenna array may include one or more beamforming antennas that may be used to direct the transmit and receive signals of the sector by a process known as beamforming. A processor in a network node 130 may instruct a beamformer in the network node to selectively weight and delay the signals transmitted by each of the directional antennas in order to direct the main lobe 340 (e.g. the bulk of the transmitted signal power) in a desired direction. Similarly, signals received by the one or more directional antennas may be weighted, delayed and summed using beamforming techniques to change the effective listening direction of the receiver. The directional antennas included in a sector 310 may be directed at any angle up to 180 degrees. In addition to main lobe 340, sectors 310 may also produce sub-nodes 350 which may create interference signals 360. It may be desirable to reduce the effect that interference signals 360 have on the transmission speed and coverage of the multi-hop wireless network.

Figure 4:
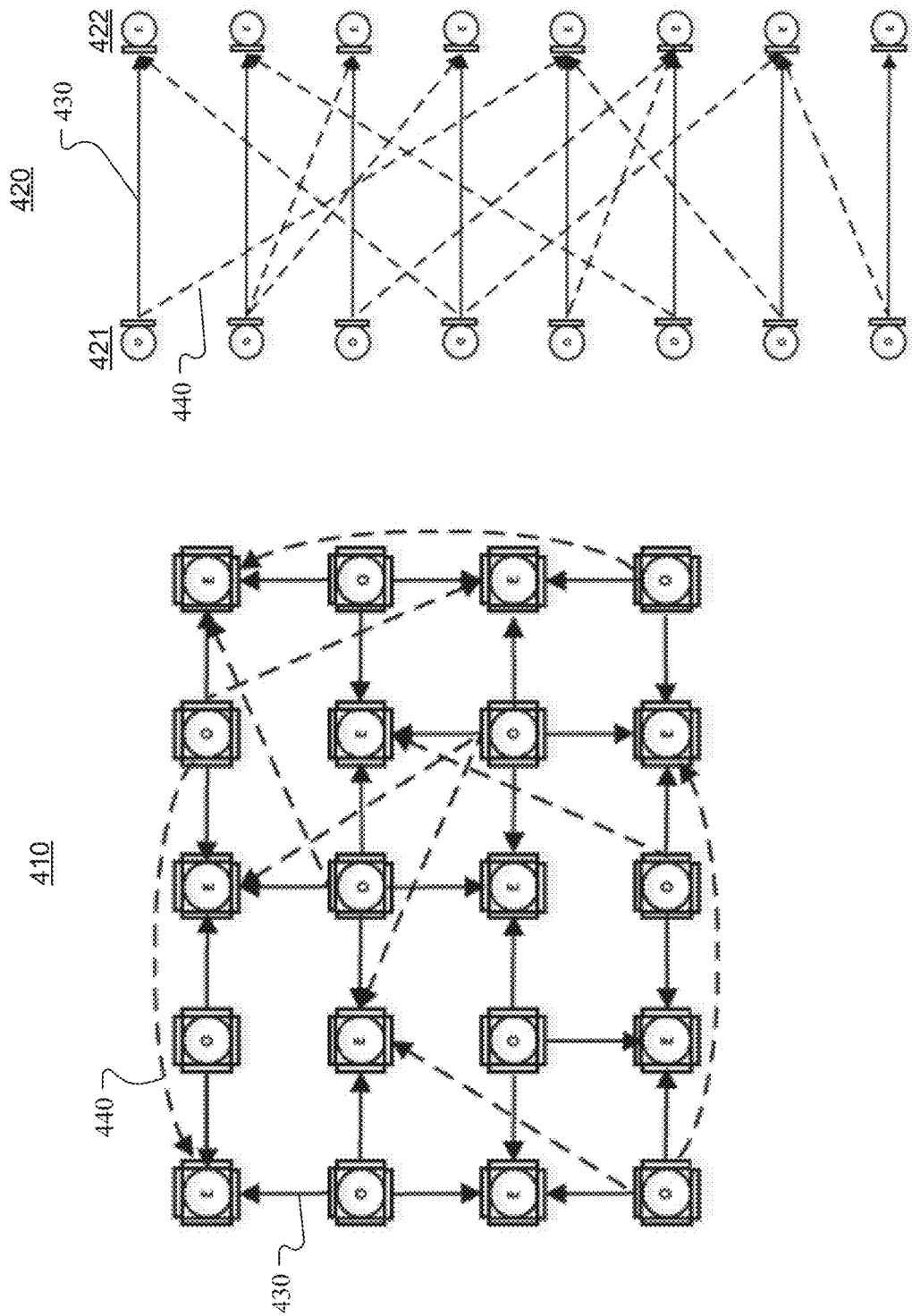
FIG. 4 illustrates a top-down perspective of an example multi-hop wireless network and an example corresponding bipartite-graph representation.

Beamforming optimization involves at least some pairs of network nodes being directed to select a communication path other than the best communication path. Therefore, the network node pair may not select the best transmit and receive beamforming directions for themselves. Instead, the network node pair may select the second- or third-best transmit and receive beamforming directions because one of those beamform pairs may have been determined to be better for the network as a whole. To implement the solutions discussed above, the network can be represented as a bipartite graph, with transmitting (TX) sectors in one set and receiving (RX) sectors in the other set. An example of such a bipartite graph representation is illustrated in FIG. 4, illustrates a top-down perspective of an example multi-hop wireless network 140 and an example corresponding bipartite-graph representation 420. An instance of a TX or RX sector is represented as a node in graph 420, and connections between sectors are represented by edges. A connection may be a desired link or interference. A desired link may be visually represented in the graph as a solid line 430, and interference may be visually represented as a dashed line 440. An instance of a TX sector in the graph may be referred to as a TX node. The TX nodes are represented in a first set 421. An instance of an RX sector in the graph 420 may be referred to as an RX node. The RX nodes are represented in a second set 422.

Figure 5:
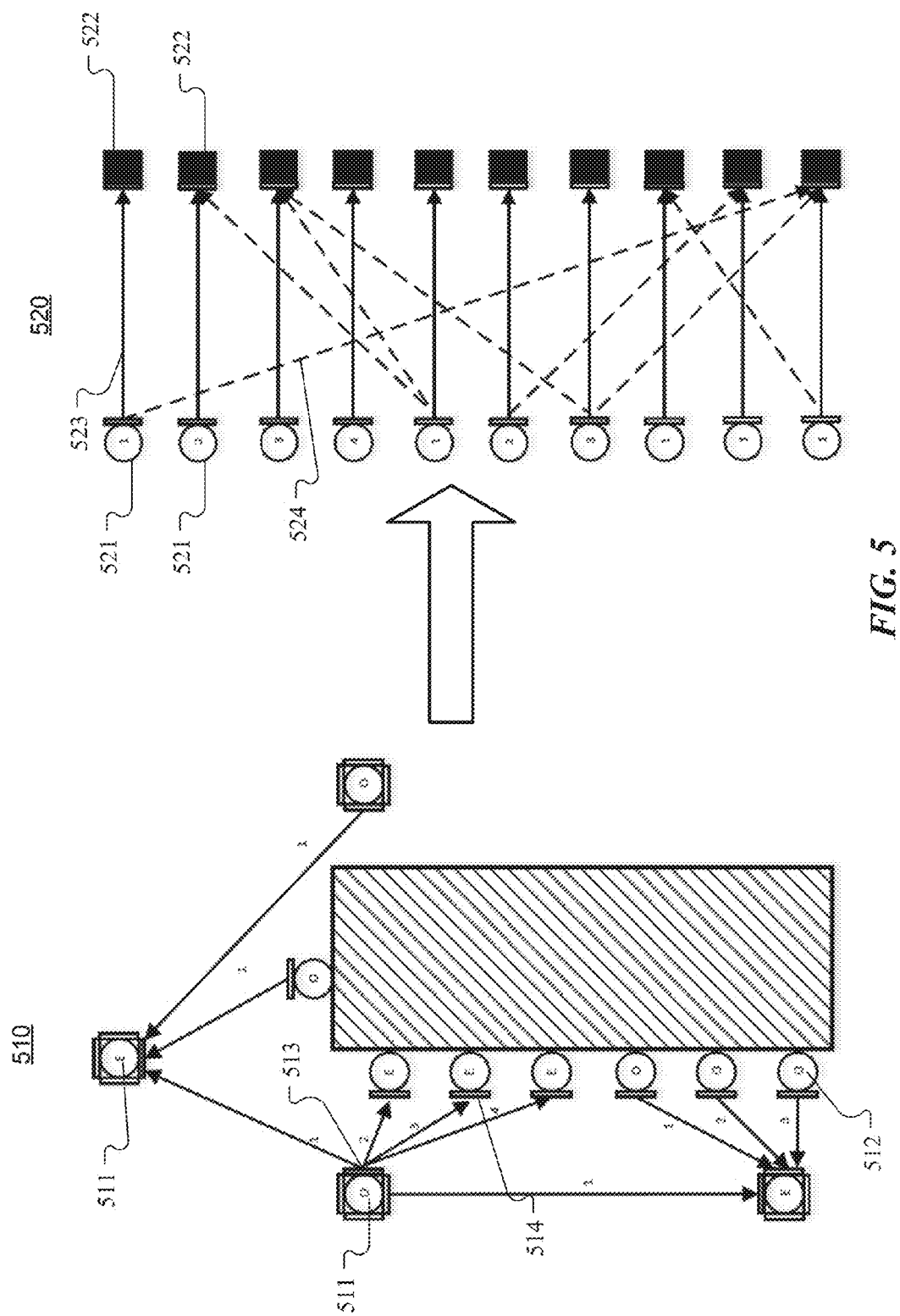
FIG. 5 illustrates a top-down perspective of an example multi-hop wireless network and an example corresponding factor-graph representation.

In many instances, network nodes include multiple sectors. FIG. 5 illustrates an example bipartite-graph representation 520 of an example multi-hop network 510 at the sector level. Pictured in the multi-hop network 510 are several distribution nodes 511 connected to multiple customer nodes 512. The customer nodes 512 are attached to a building. The bipartite-graph representation includes an instance of each TX sector 513 for every RX sector 514 that the TX sector 513 transmits to, with each TX sector 513 potentially having multiple instances of a TX node 521 in the bipartite-graph representation 520 (e.g. being represented by multiple TX nodes 521 in the graph). If a TX sector 513 transmits to multiple RX sectors 514, then the bipartite-graph representation 520 will include multiple TX nodes 521 representing the TX sector 513. Multiple instances of the same TX sector 513 in the bipartite-graph representation 520 may be referred to as a "TX TDM clique." Similarly, the graph includes an instance of each RX sector 514 for every TX sector 513 that the RX sector 514 receives transmissions from, with each RX sector 514 potentially having multiple instances in the bipartite-graph representation 520 (e.g. being represented by multiple RX nodes 522 in the graph). If an RX sector receives transmissions from multiple TX sectors, then the bipartite-graph representation 520 will include multiple RX nodes representing the RX sector. Multiple instances of the same RX sector 514 in the bipartite-graph representation 520 may be referred to as an "RX TDM clique." An RX node 522 can have only one TX node 521 from a TX TDM clique connected to it as a desired link and cannot be connected to other TX nodes in the TX TDM clique as interference. An RX node can have more than one TX node 521 connected to it as interference, but those TX nodes 521 must belong to "non-serving" TX TDM cliques. An RX node 522 can be served by only one TX node 521 and cannot receive interference from a TX node 521 serving another RX node 522 in the same RX TDM clique.

The number of desired links in the network may be approximated as Nlinks≈NCN+2NDN. NCN represents the number of customer nodes in the network, and NDN represents the number of distribution nodes in the network. Each link 523 has an individual link capacity $C_j$, which may include two parts: the desired signal part and the interference part from neighboring network nodes. $C_j$ may be negatively affected by surrounding interference links 524. Capacity may be understood to mean the maximum rate at which the multi-hop wireless network can transmit data with no interference present. If there is no interference, it may be thought of as a theoretical limit, and it may be desirable to adjust the network nodes to attempt to reach this limit. Thus, the goal of the interference management system may be to increase the capacity of all links in the network by reducing the interference as much as possible. This may be referred to as maximizing the sum-capacity C of the network, because C may be the sum of all the individual link capacities $C_j$, taking into consideration the negative interference effects. Sum-capacity may be expressed as the following formula:

$$C = \sum_{n=0}^{Nlinks-1} C_j = \sum_{n=0}^{Nlinks-1} \log\left(1 + \frac{(w_n^{r*} H_{n,n} w_n^t)^2}{\sum_{k \in \Theta(j)} (w_n^{r*} H_{n,k} w_k^t)^2 + N_0}\right).$$

In this formula, $\Theta(j)$ is the set of sectors interfering the sector j; $w_n^r$, $w_k^t$ are the receive and transmit beamforming vectors for sectors n and k respectively; and $H_{n,k}$ is the multiple-input multiple-output (MIMO) propagation channel from sector k to sector n. $P_n^s = \|w_n^{r*} H_{n,n} w_n^t\|$ is measured during beamforming link-level acquisition, and $P_{n,k}^I = \|w_n^{r*} H_{n,k} w_k^t\|$ is measured during interference characterization. Nlinks≈NCN+2NDN is the number of links, as described above.

The complexity actually summing every combination of micro-routes and nano-routes in a multi-hop wireless network is nearly infinite. Thus, it may be necessary to cast the sum capacity as an inference problem in probability theory. The sum capacity function resembles the multivariate probability density function which may be factored into multiple terms of local functions $C_j$, each dependent on a subset of variables $\Theta(j)$. In this situation, the random variables may be the pairs of TX and RX beamforming weights for desired links. The values of these pairs of TX and RX beamforming weights may have been determined during initial training or beamform acquisition. The local function $C_j$ may represent the individual link capacity for a given link on the multi-hop wireless network and may be expressed as:

$$C_j = \log\left(1 + \frac{P_j^S}{\sum_{k \in \Theta(j)} P_{n,k}^I + N_0}\right).$$

Cast this way, "inference" is the problem of computing the posterior marginal distribution of an unknown variable given an observed variable. As will be appreciated by those skilled in the art, a posterior probability distribution (also referred to as a posteriori probability distribution) is the probability distribution of an unknown quantity (e.g. random variable), conditional on the evidence obtained from measured data. In probability theory, the marginal distribution of a subset of a collection of random variables is the probability distribution of the variables contained in the subset. Locating the maximum on the marginal distributions of the random variables, then summing all the maximums, may provide the sum of the maximum marginal distributions in the subset. Applying these principles to an interference management system in a multi-hop wireless network, locating the maximum of the marginal a posteriori probability distributions for the pair of TX and RX beamforming weights for each desired link (e.g. random variable), and then summing these maximums, returns the maximum sum-capacity of the multi-hop wireless network. To further elaborate, each pair of TX and RX beamforming weights may be treated as a random variable, because the pair of TX and RX beamforming weights may be different values, and the selection of these values may be regarded as random (within pre-defined limits, obtained during beamform acquisition). Thus, a probability distribution may be generated of the values that each pair of TX and RX beamforming weights may take. Then the maximum of each probability distribution may be identified and summed to determine the sum-capacity of the entire system.

To accomplish the above in light of the iterative interference that will occur once the beamforming weights are adjusted on one or more network nodes, a factor graph of the probability distributions may need to be created. A factor graph is a special type of bipartite graph. Vertices on the factor graph are Variable nodes in one set and Function nodes in the other set. In the context of a multi-hop wireless network, each Variable node may represent a pair of TX and RX beamforming weights of a desired link (e.g. random variable). The Function node may represent the capacity equation $C_j$ of that desired link (e.g. the local function). Note that in a factor graph, the vertices on the right side of the factor graph no longer represent receiving network nodes, as they did on the bipartite-graph representation 520. In the factor graph, values of both the transmitting and receiving network nodes are represented by the Variable nodes. The vertices on the other side (e.g. Function nodes) represent the capacity equation $C_j$. Nodes exchange their "beliefs" about the beamforming weight values that each pair of TX and RX nodes "believes" is best for that pair. This may be referred to as belief propagation. Each pair of TX and RX beamforming weights has a relatively small number of beamforming weights that it believes may be best, based on the beliefs of neighboring pairs of network nodes. Realistically, a given link will only observe interference from two to four interference links.

Belief propagation works by sending messages along the edges of the factor graph. Variable node i is associated with a random variable X, which is a given pair of TX and RX beamforming weights corresponding to different micro- and nano-routes of the given link (e.g. $X_i=\{w_i^r, w_i^t\}$). Due to prior beamforming acquisition, the set of all the beamforming weights may be reduce to a small subset of micro- and nano-routes, as shown in FIG. 2, discussed above. Thus, $X_i$ may be specific to each sector (e.g. variable node). This reduction in possible values a given pair of TX and RX beamforming weights may take greatly reduces the complexity of the algorithm to $7O(N_{iterations}(N_{micro}(N_{nano})^2)^{N_{neighbors}})$ with the $N_{neighbors}$ exponential term expected to be very small (e.g. 2, 3, or 4). Without reducing the problem by applying belief propagation techniques and marginal distribution probability principles, the exponential term would be the number of links in the entire multi-hop network (e.g. 10,000 links). This, the complexity of the algorithm is greatly reduced.

In the case of factor graphs with cycles, the process runs iteratively, meaning that a message that is passed from function nodes to variable nodes in iteration t+1 may be derived from messages passed from variable nodes to function nodes in iteration t.

Figure 6:
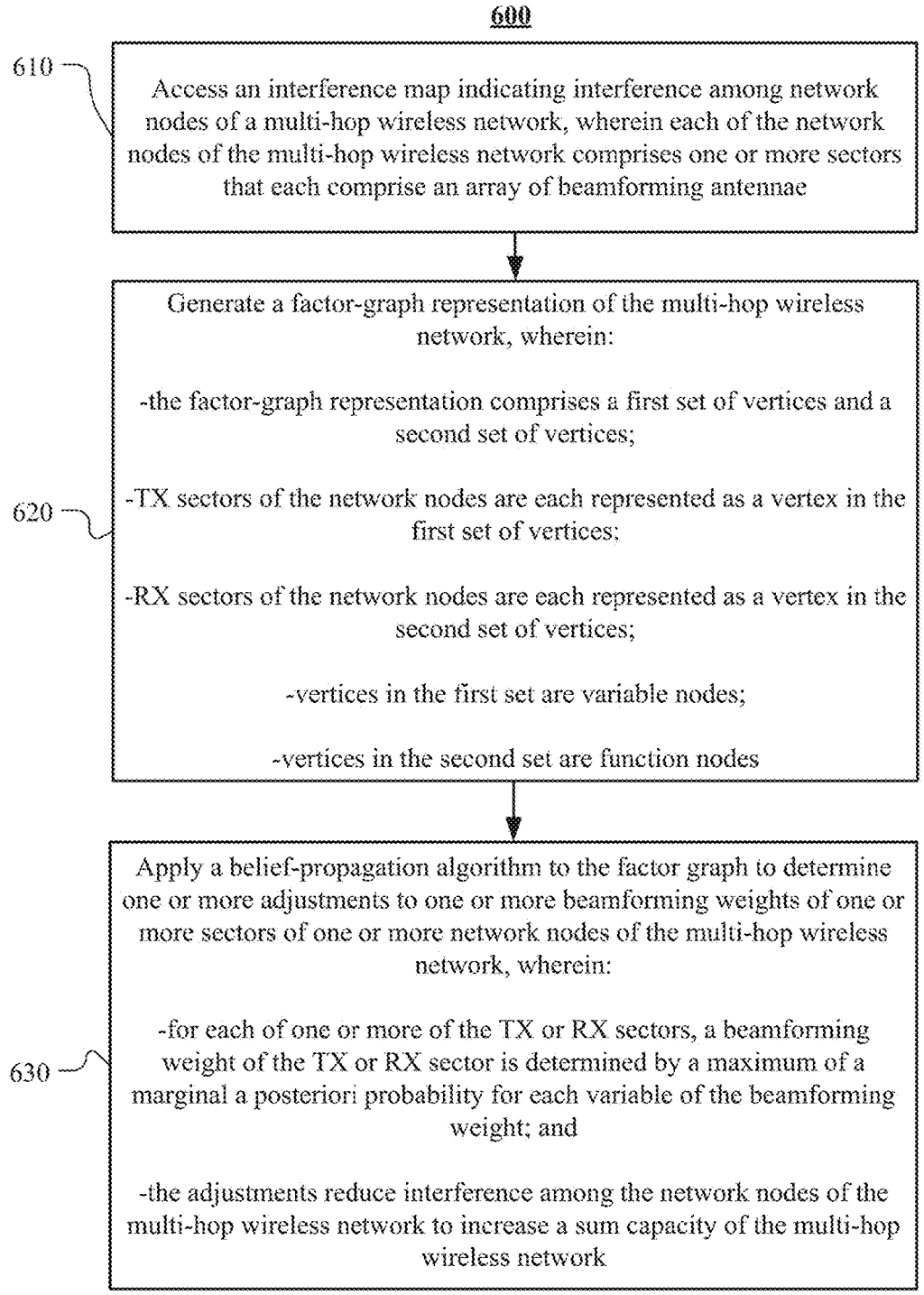
FIG. 6 illustrates an example method for interference management in a multi-hop wireless network.

FIG. 6 illustrates an example method 600 for interference management in a multi-hop wireless network. The method 600 may begin at step 610, where an interference map is accessed. The interference map may indicate interference among network nodes of a multi-hop wireless network, wherein each of the network nodes of the multi-hop wireless network includes one or more sectors that each include an array of beamforming antennae. At step 620, the method may generate a factor-graph representation of the multi-hop wireless network, wherein the factor-graph representation includes a first set of vertices and a second set of vertices; transmitting (TX) sectors of the network nodes are each represented as a vertex in the first set of vertices; receiving (RX) sectors of the network nodes are each represented as a vertex in the second set of vertices; vertices in the first set are variable nodes; vertices in the second set are function nodes. At step 630, the method may apply a belief-propagation algorithm to the factor graph to determine one or more adjustments to one or more beamforming weights of one or more sectors of one or more network nodes of the multi-hop wireless network, wherein: for each of one or more of the TX or RX sectors, a beamforming weight of the TX or RX sector is determined by a maximum of a marginal a posteriori probability for each variable of the beamforming weight; and the adjustments reduce interference among the network nodes of the multi-hop wireless network to increase a sum capacity of the multi-hop wireless network. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating and sending tag candidates to a client system including the particular steps of the method of FIG. 6, this disclosure contemplates any suitable method for generating and sending tag candidates to a client system including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, a variable of the beamforming weight may include the phase of a signal transmitted by the TX sector or received by the RX sector. In a beamforming antenna array, each antenna has its own signal phase. By varying the signal phases of the elements in a linear antenna array, the main beam of the antenna array may be steered. In an electronically steered array, programmable electronic phase shifters are used at each antenna in the array. The signal of the antenna array may be steered by programming the required phase shift value for each element. As an example and not by way of limitation, an antenna array comprising eight antennas may have a progressive phase shift of $0.7\pi$ for each antenna. This may cause the central beam like that of 340 to be steered approximately 45 degrees to the left.

In particular embodiments, the adjustments to the one or more beamforming weights may include excluding one or more micro-routes on the multi-hop wireless network. As shown in FIG. 2, transmitting network node 201 has two micro-route options 210 and 220 to transmit its signal to receiving network node 202. There may exist more than two micro-routes, but two are discussed here for simplicity reasons. Micro-route 210 may be just as suitable as micro-route 220 in transmitting data to from transmitting network node 201 to receiving network node 202. However, the interference management system may determine that one of the micro-routes is unsuitable due to interference caused by transmitting data over that micro-route. Thus, it may be determined that one micro-route should be excluded from transmitting data. This may mean that a network node may either receive instructions or autonomously determine that data may not be transmitted over a particular micro-route. Thus, the network node may exclude that micro-route and its associated beamforming weights from its available list of micro-routes and associated beamforming weights. As an example and not by way of limitation, the network management system may determine that micro-route 210 causes too much interference with neighboring links and should be avoided completely. Thus, transmitting network node 201 may be directed or may autonomously determine that micro-route 210 or nano-routes 211 will be excluded from transmitting or receiving data. This may increase the efficiency with which transmitting network node 201 determines or identifies its appropriate beamforming weights. Similarly, receiving node 202 may be directed or may autonomously determine that micro-route 210 or nano-routes 212 will be excluded from receiving or transmitting data. This may increase the efficiency with which transmitting network node 201 determines or identifies its appropriate beamforming weights. Thus, in particular embodiments, a plurality of network nodes of a multi-hop wireless network may be identified, wherein each of the network nodes of the multi-hop wireless network includes one or more arrays of beamforming antennae. Then a plurality of micro-routes on the multi-hop wireless network may be identified, wherein each micro-route includes a signal path from a first array of beamforming antennae on a first network node to a second array of beamforming antennae on a second network node. Further, at least one of the plurality of micro-routes may be excluded, the exclusion being based on an optimization scheme for the multi-hop wireless network.

In particular embodiments, the method may additionally include identifying one or more golden links, wherein the network nodes connecting the golden links are configured to maximize a signal strength on the golden links. A golden link may be understood to mean a link that is more critical to the functioning of the multi-hop wireless network than other links in the multi-hop wireless network. As an example and not by way of limitation, links closer to a Point of Presence (PoP) network node may be determined to be vital to the functionality of the multi-hop network. Therefore, it may be determined that those links should adjust their beamforming weights to maximize their link capacity without regard to the interference effects those beamforming weights have on neighboring links. One or more links in the multi-hop network may be assigned a priority weight. Priority weight may be understood to mean a scalar that represents the importance of a particular link. As an example and not by way of limitation, links close to the PoP node may receive a priority weight that is higher than the priority weight of other links in the multi-hop wireless network. These links with a higher priority weight may take precedence over links with a lower priority weight and may be configured to maintain a high link capacity rather than sacrificing some link capacity to reduce interference with neighboring network nodes. Thus, in particular embodiments, the method may additionally include assigning to one or more subsets of network nodes one or more priority weights, wherein nodes assigned higher priority weight are configured to maximize a signal strength of a wireless connection between the nodes assigned higher priority weight.

In particular embodiments, the signals between network nodes in the multi-hop wireless network may operate according to a time division multiplex scheme. Under such a scheme, signals that would normally interfere with each other if sent simultaneously are scheduled to be sent at different times. This may be accomplished by scheduling particular network nodes to transmit and receive at different slots in a time frame comprising two or more time slots. Time division multiplexing may be understood to be a method of transmitting and receiving independent signals over a common signal path. In this case, that signal path may be understood to mean the same frequency (e.g., 60 GHz). Time division multiplexing may allow more network nodes to select the best beamforming weights for their own link capacity, as interfering links may be scheduled to transmit at different times. If time division multiplexing is used as a way to avoid interference, slot occupancy may be orthogonalized among links so that links that are prone to interference do not transmit at the same time.

To accomplish the above goals, it may be assumed that a total of $N_{slots}$ slots and $N_{links}$ links are available as degrees of freedom. Thus the total capacity C of the system may be expressed as:

$$C = \sum_{n=0}^{N_{links}-1} \sum_{s=0}^{N_{slots}-1} \log\left(1 + \frac{(w_{n,s}^{r*} H_{n,n} w_{n,s}^{t})^2}{\sum_{k \in \Theta(j)} (w_{n,s}^{r*} H_{n,k} w_{k,s}^{t})^2 + N_0}\right)$$

In the formula above, pairs of receiving and transmitting beamforming weights $X_i = \{w_i^r, w_i^t\}$ are selected from a set of $\chi_i^{slot}$ constructed as the Kronecker product of $\{w_{greedy,i}^r, w_{greedy,i}^t\}$ with the set $\beta$ consisting of all realizations of the binary index vector (also referred to as the slot-by-slot on/off pattern) of length $N_{slots}$.

$$\beta = \left\{\underbrace{00 \ldots 01}_{N_{slots}}, 00 \ldots 10, \ldots, 11 \ldots 11\right\}$$

The number of elements in the set $\chi_i^{slot}$ is $|\chi_i^{slot}| = 2^{N_{slot}} - 1$.

$$\chi_i^{slot} =$$

$$\{w_{greedy,i}^r, w_{greedy,i}^t\} \otimes \beta = \begin{cases} 00 \ldots 0\{w_{greedy,i}^r, w_{greedy,i}^t\}, \\ 00 \ldots \{w_{greedy,i}^r, w_{greedy,i}^t\}0, \ldots, \\ \{w_{greedy,i}^r, w_{greedy,i}^t\}\{w_{greedy,i}^r, w_{greedy,i}^t\} \ldots \\ \underline{\{w_{greedy,i}^r, w_{greedy,i}^t\}\{w_{greedy,i}^r, w_{greedy,i}^t\}} \\ N_{slot} \end{cases}$$

The complexity for slot-only exclusions may be $\sim O(N_{iterations}(2^{N_{slots}}-1)^{N_{neighbors}})$, or in this case $\sim 3(N_{iterations}(2^{N_{slots}}-1)^{N_{neighbors}})$.

To optimize by beamforming and scheduling exclusions together, the set $\chi_i^{join}$ is formed by the Kronecker product of the original $\chi_i$ and the set $\beta$ consisting of all realizations of the binary index vector of length $\chi_i^{join} = \chi_i \otimes \beta$. The number of elements in the set $\chi_i^{join}$ is $|\chi_i^{slot}| = N_{micro}(N_{nano})^2 (2^{N_{slots}}-1)$. The complexity for joint beamforming optimization and scheduling exclusions may be $\sim O(N_{iterations}(N_{micro}(N_{nano})^2(2^{N_{slots}}-1))^{N_{neighbors}})$.

As previously discussed, the above approach can be modified for non-equal-link-capacity optimization (e.g. swaying link capacity toward golden links) by giving more weight to links around PoPs. This can be done by assigning the non-equal weights G(a) in factor-node belief-message generation in the Belief Propagation algorithm, according to the following formula:

$$\overline{M}_{a \to i}(x_i) = \frac{1}{Z_{a \to i}} \sum_{X_a \setminus x_i} e^{G(a)C_a(X_a)} \prod_{j \in N(a)\setminus i} M_{j \to a}(x_j), Z_{a \to i} = 1 \Big/ \sum_{x_i} \overline{M}_{a \to i}(x_i)$$

Links around PoPs can be excluded from trade-off, e.g., golden links can stick to their greedily selected beamforming weights while other links cooperate to maximize sum capacity.

Figure 7:
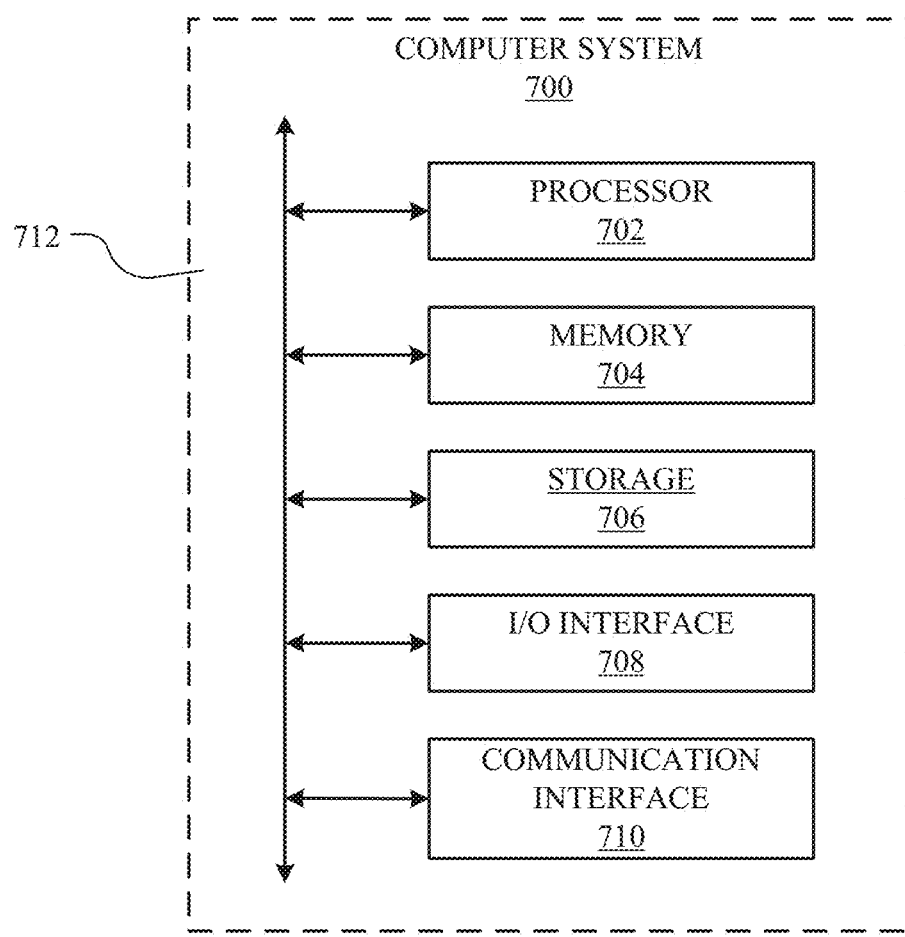
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a controller of a multi-hop wireless network, accessing an interference map indicating interference among network nodes of the multi-hop wireless network, wherein each of the network nodes of the multi-hop wireless network comprises one or more sectors that each comprise an array of beamforming antennae; and
generating a factor-graph representation of the multi-hop wireless network, wherein:
the factor-graph representation comprises a first set of vertices and a second set of vertices;
transmitting (TX) sectors of the network nodes of the multi-hop wireless network are each represented as a vertex in the first set of vertices;
receiving (RX) sectors of the network nodes of the multi-hop wireless network are each represented as a vertex in the second set of vertices;
vertices in the first set are variable nodes of the factor-graph representation; and
vertices in the second set are function nodes of the factor-graph representation; and
by the controller of the multi-hop wireless network, determining one or more adjustments to one or more beamforming weights of one or more sectors of one or more network nodes of the multi-hop wireless network, wherein:
for each of one or more of the TX or RX sectors, a beamforming weight of the TX or RX sector is determined by a marginal a posteriori probability for each variable of the beamforming weight; and
the adjustments reduce interference among the network nodes of the multi-hop wireless network to increase a sum capacity of the multi-hop wireless network.

2. The method of claim 1, further comprising sending the adjustments to at least one of the network nodes of the multi-hop wireless network.

3. The method of claim 1, wherein, in the factor-graph representation of the multi-hop wireless network:
for each TX sector, for each RX sector served by the TX sector, a variable node is produced; and
for each RX sector, for each TX sector serving the RX sector, a function node is produced.

4. The method of claim 1, wherein a variable of the beamforming weight comprises the phase of a signal transmitted by the TX sector or received by the RX sector.

5. The method of claim 1, further comprising adjusting the one or more arrays of beamforming antennae on the one or more network nodes to optimize a sum-capacity of the multi-hop wireless network.

6. The method of claim 1, wherein the adjustments to the one or more beamforming weights comprise excluding one or more micro-routes on the multi-hop wireless network.

7. The method of claim 1, further comprising identifying one or more golden links, wherein the network nodes connecting the golden links are configured to maximize a signal strength on the golden links.

8. The method of claim 1, further comprising assigning to one or more subsets of network nodes one or more priority weights, wherein nodes assigned higher priority weight are configured to increase a signal strength of a wireless connection between the nodes assigned higher priority weight.

9. A method comprising:
by a particular network node of a multi-hop wireless network, accessing a portion of a factor-graph representation of the multi-hop wireless network, wherein:
the multi-hop wireless network comprises a plurality of network nodes, including the particular network node, that each comprise at least one transmitting (TX) sector and at least one receiving (RX) sector that each comprise one or more beamforming antennae;
the factor-graph representation comprises a first set of vertices and a second set of vertices;
transmitting (TX) sectors of the network nodes of the multi-hop wireless network are each represented as a vertex in the first set of vertices;
receiving (RX) sectors of the network nodes of the multi-hop wireless network are each represented as a vertex in the second set of vertices;
vertices in the first set are variable nodes of the factor-graph representation; and
vertices in the second set are function nodes of the factor-graph representation;
by the particular network node, determining one or more adjustments to one or more beamforming weights of one or more of the beamforming antennae of the particular network node based on application of a belief-propagation algorithm to the portion of the factor-graph representation of the multi-hop wireless network; and
applying one or more of the adjustments to one or more of the beamforming weights of one or more of the beamforming antennae of the particular network node.

10. The method of claim 9, wherein, in the factor-graph representation of the multi-hop wireless network:
for each TX sector, for each RX sector served by the TX sector, a variable node is produced; and
for each RX sector, for each TX sector serving the RX sector, a function node is produced.

11. The method of claim 9, wherein a variable of the beamforming weight comprises the phase of a signal transmitted by the TX sector or received by the RX sector.

12. The method of claim 9, further comprising adjusting the one or more arrays of beamforming weights on the one or more network nodes to optimize a sum-capacity of the multi-hop wireless network.

13. The method of claim 9, wherein the adjustments to the one or more beamforming weights comprise excluding one or more micro-routes on the multi-hop wireless network.

14. The method of claim 13, wherein each micro-route comprises a signal path from a first array of beamforming antennae on a first network node to a second array of beamforming antennae on a second network node.

15. The method of claim 9, further comprising, sending the one or more adjustments to a central controller of the multi-hop wireless network.

16. The method of claim 9, wherein the adjustments to the one or more beamforming weights are based in part on one or more golden links, wherein the network nodes connecting the golden links are configured to maximize a signal strength on the golden links.

17. The method of claim 9, wherein the adjustments to the one or more beamforming weights are based in part on one or more priority weights to one or more subsets of network nodes, wherein nodes assigned higher priority weight are configured to increase a signal strength of a wireless connection between the nodes assigned higher priority weight.

18. A device, comprising:
one or more processors, and a memory coupled to the processors comprising instructions executable by the processors, the processors being operable when executing the instructions to:

access an interference map indicating interference among network nodes of the multi-hop wireless network, wherein each of the network nodes of the multi-hop wireless network comprises one or more sectors that each comprise an array of beamforming antennae; and generate a factor-graph representation of the multi-hop wireless network, wherein:
- the factor-graph representation comprises a first set of vertices and a second set of vertices;
- transmitting (TX) sectors of the network nodes of the multi-hop wireless network are each represented as a vertex in the first set of vertices;
- receiving (RX) sectors of the network nodes of the multi-hop wireless network are each represented as a vertex in the second set of vertices;
- vertices in the first set are variable nodes of the factor-graph representation; and
- vertices in the second set are function nodes of the factor-graph representation; and determine one or more adjustments to one or more beamforming weights of one or more sectors of one or more network nodes of the multi-hop wireless network, wherein:
- for each of one or more of the TX or RX sectors, a beamforming weight of the TX or RX sector is determined by a marginal a posteriori probability for each variable of the beamforming weight; and
- the adjustments reduce interference among the network nodes of the multi-hop wireless network to increase a sum capacity of the multi-hop wireless network.

19. The central controller of claim 18, wherein the processors are further operable when executing the instructions to send the adjustments to at least one of the network nodes of the multi-hop wireless network.

20. A device, comprising:

one or more processors, and a memory coupled to the processors comprising instructions executable by the processors, the processors being operable when executing the instructions to:

access a portion of a factor-graph representation of the multi-hop wireless network, wherein:
- the multi-hop wireless network comprises a plurality of network nodes that each comprise at least one transmitting (TX) sectors and at least one receiving (RX) sectors that each comprise one or more beamforming antennae;
- the factor-graph representation comprises a first set of vertices and a second set of vertices;
- transmitting (TX) sectors of the network nodes of the multi-hop wireless network are each represented as a vertex in the first set of vertices;
- receiving (RX) sectors of the network nodes of the multi-hop wireless network are each represented as a vertex in the second set of vertices;
- vertices in the first set are variable nodes of the factor-graph representation;
- vertices in the second set are function nodes of the factor-graph representation; and
- the vertices in the first set are connected to the vertices in the second set by one or more edges;

determine one or more adjustments to one or more beamforming weights of one or more of the beamforming antennae of the particular network node based on application of a belief-propagation algorithm to the portion of the factor-graph representation of the multi-hop wireless network; and apply one or more of the adjustments to one or more of the beamforming weights of one or more of the beamforming antennae of a particular network node.

* * * * *